J. B. ENTZ.
ELECTRIC METER.
APPLICATION FILED MAR. 17, 1910.
1,046,750.
Patented Dec. 10, 1912.
2 SHEETS—SHEET 1.
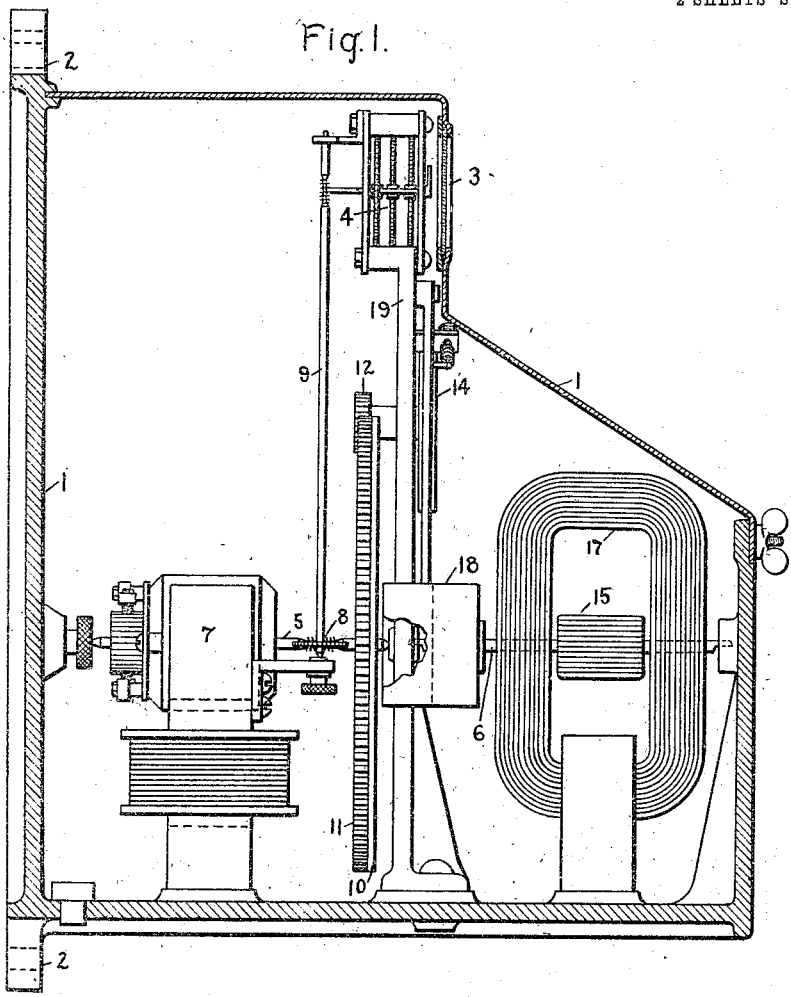
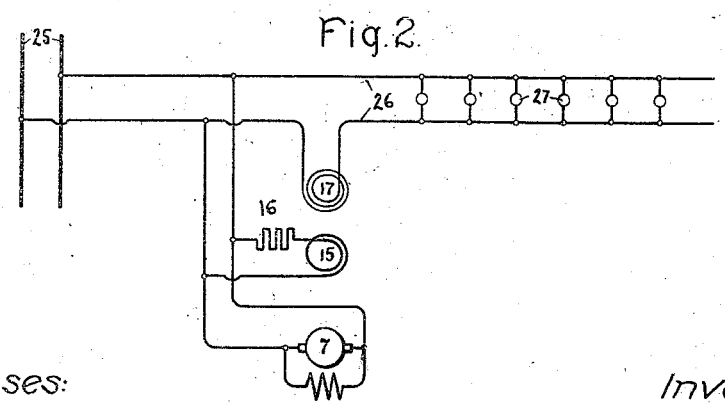
Witnesses:
Inventor
Justus B. Entz,
by His Attorney.

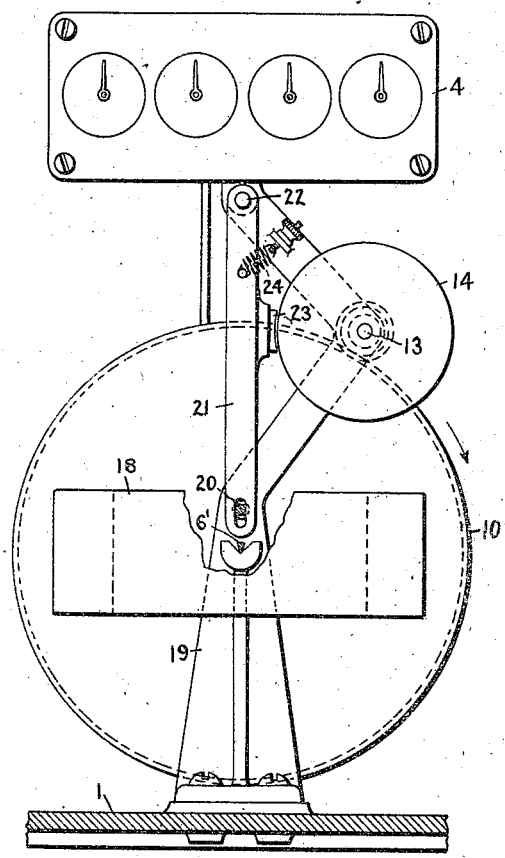
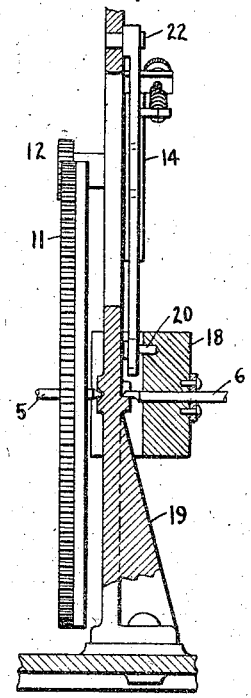
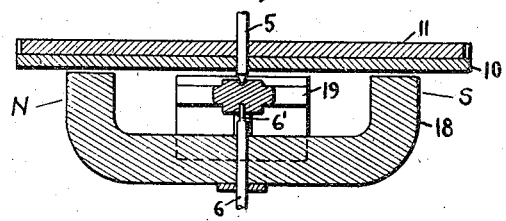

UNITED STATES PATENT OFFICE.

JUSTUS B. ENTZ, OF CLEVELAND, OHIO, ASSIGNOR TO GENERAL ELECTRIC COMPANY, A CORPORATION OF NEW YORK.

ELECTRIC METER.

1,046,750.　　　　　Specification of Letters Patent.　　Patented Dec. 10, 1912.

Application filed March 17, 1910. Serial No. 550,023.

*To all whom it may concern:*

Be it known that I, JUSTUS B. ENTZ, a citizen of the United States, residing at Cleveland, county of Cuyahoga, State of Ohio, have invented certain new and useful Improvements in Electric Meters, of which the following is a specification.

My invention relates to electric meters and has for its object the construction of a novel form of meter which shall be at once simple in its parts and accurate in its registration.

I accomplish the object of my invention by the use of a driving motor which operates the meter registering mechanism. The speed of this motor is restrained by a suitable braking means whose effect is altered by a dynamometer connected to the circuit to be measured, so that the speed of the driving mechanism, and hence the registration of the meter, shall vary with the consumption of energy or current in this circuit.

The further novelties of my invention are pointed out with more particularity in the claims annexed to and forming a part of this specification.

For a further understanding of my invention, reference may be had to the accompanying drawings where—

Figure 1 is a vertical side view, partially in section, of a meter embodying my invention; Fig. 2 is a diagram of connections for the meter; Fig. 3 is a vertical front view of a portion of the meter mechanism; Fig. 4 is a vertical side view, partially in section, of a portion of the meter mechanism; and Fig. 5 is a horizontal section of a portion of the meter mechanism.

Referring first to Fig. 1, the meter is provided with a case 1, having suitable lugs 2 for fastening the meter in its desired location. The casing is provided with an opening or window 3 for observing the registering mechanism 4 which may be of any of the usual types. Horizontally disposed within the meter casing is a shaft 5, and substantially in line with shaft 5 is a second shaft 6 which is mounted on knife edges 6' and is arranged for turning but not for rotating. Shaft 5 is driven by a motor 7 which may be of any suitable character, and I have illustrated this motor as being an electric one of a certain kind but do not limit myself in any way to a specific form of motor. Shaft 5, by means of the worm and gear mechanism 8, drives a vertical shaft 9 which operates the registering mechanism.

Rigidly mounted on shaft 5 is a disk 10 to which is attached a gear wheel 11. In operative relation with this gear wheel is a pinion 12, which, by means of a shaft 13, rotates a second disk 14. Rigidly mounted on the one end of shaft 6 is a movable coil 15 of a dynamometer connected in shunt to the circuit in series with a suitable resistance 16, as shown in Fig. 2. The stationary coil of the dynamometer 17 is connected in series with the circuit and thus the torque developed between the two coils will depend upon the watts in the circuit, and the meter, as illustrated, is a watt-meter. I do not limit my invention however to watt-meter, but may, if I so desire, apply it to other varieties of meter. Rigidly mounted on shaft 6 at its other end is a permanent U-shaped magnet 18 having its poles in close relation with disk 10 on either side of frame 19, as may be seen in Figs. 4 and 5. Magnet 18 is provided with a pin 20 which engages with a slot in the lower end of lever 21 pivoted at 22 to the upper end of the frame 19. Attached to this lever is a brake 23 which is in operative relation with disk 14 and so arranged that upon application of pressure to this brake it will cause disk 14, and hence shaft 5, to stop or alter its rate of motion. Attached to the brake lever 21 is also a spring 24 which may be made adjustable and which imparts an initial pressure to the brake.

While I have illustrated the brake as applied to a second disk in order to obtain a multiplication of the braking effect, I do not limit myself to this construction but may use any suitable construction for applying the brake to the driving motor.

The principle upon which my invention works is as follows: The driving motor 7 operating the registering device 4, normally has a tendency to run at a certain speed. This speed will depend upon the character of the motor, the friction resistance of the mechanism operated by it and the resistance to be overcome in revolving the disk in the constant magnetic field of magnet 18. The friction resistance varies slightly with the speed and the disk resistance varies directly in proportion to the speed. Restraining this speed is the brake 23. This brake has an initial pressure imparted to it by spring 24. When the motor is rotating and driving the disk in the direction of the arrow shown in Fig. 3, the magnetic drag upon the magnet will cause the latter to also turn in the same direction as the disk and apply a pressure to the brake, as may be seen by an inspection of Fig. 3. The greater the speed of the motor, the greater the pull upon the magnet, and hence the greater the braking effect, as will be obvious. The dynamometer is so connected that when current is flowing through it, the torque developed between its stationary and movable coils will turn the magnet in a direction contrary to that given it by the disk. When current flows, the dynamometer will, therefore, change the position of the magnet and alter its braking effect.

The initial pressure of the brake is so adjusted that it is sufficient to keep the motor from moving when no current is flowing in the dynamometer coils. When a very small amount of current is flowing, the dynamometer will turn the second shaft 6 and magnet 18 in such a direction as to release the brake and allow the motor to start. The motor will thereupon rotate the disk in the direction shown by the arrow and the disk's movement will turn the magnet in the same direction, thus causing it to apply the brake as explained above, which action will be opposed by the dynamometer torque. The motor, and hence the registering mechanism, will therefore rotate at a speed depending upon the brake resistance which is controlled by the resultant action upon the brake of the motor speed, and the dynamometer torque varying with the watts in the circuit tending to release the brake. If the energy to be measured in the circuit decreases, the dynamometer torque will decrease also and the motor will have its speed reduced since the drag upon the magnet will not be opposed by such a large torque in the dynamometer coils as previously. Conversely, if the energy in the circuit to be measured increases, the torque in the dynamometer will increase and the drag upon the magnet will be opposed by a greater force than previously, and hence the brake will be released and the motor will speed up.

Owing to the construction, the braking effect is so multiplied that a pull of one unit at the magnet poles or the coils is equal to a braking resistance of fifty units. So that it follows that a difference of one unit between the speed and the watts in the dynamometer coil compensates for a difference of fifty units between the motor torque and the meter resistance other than brake resistance. From this it will be seen that the slight increase in friction and the magnetic drag, due to the increase of speed in the motor, is offset by the multiplication of the braking effect. The slight energy required to overcome the initial brake pressure, as explained above, is also offset for the same reason, and I have found that the speed of the registering device will be very closely proportional to the watts in the circuit to be measured. The new principle of my meter is that it is a meter governed to give a speed proportional to the energy in the circuit by controlling the resistance to motion opposing the driving torque, by a brake differentially acted upon by a force varying with the watts in the circuit and with the speed. A small difference, therefore, between the energy in the circuit and the speed compensates for a much larger difference between the driving torque of the motor and the meter friction. Meters in which the resistance to motion at all speeds is balanced to equal the driving effect at those speeds, and in which the driving effort must always bear the same relation to the watts to be recorded, which is the class to which practically all recording meters now built belong, are much more in need of a fine adjustment than the meter which I have invented.

The connections of the meter are shown in Fig. 2, the meter being connected between the supply mains 25 and the feeding mains 26 of the circuit to be measured, which may have connected to it suitable translating devices 27.

While I have described a preferred embodiment of my invention, I do not limit myself to this embodiment but seek in the appended claims to cover all embodiments which shall be obvious to those skilled in the art and be within the scope of my invention.

What I claim as new and desire to secure by Letters Patent of the United States, is,—

1. In an electric meter, the combination of a registering mechanism, a driving motor operating said mechanism, a brake, magnetic means applying the brake to the motor, and a dynamometer releasing said brake.

2. In an electric meter, the combination of a registering mechanism, a driving motor operating said mechanism, a brake, magnetic means dependent upon the speed of the motor applying the brake to the same, and a dynamometer releasing said brake.

3. In an electric meter, a driving shaft, a motor rotating said shaft, a second shaft substantially in line with the first, a magnetic drag connection between the two shafts, means dependent upon the position of the second shaft braking the first shaft, and a dynamometer in operative relation to the second shaft restraining said braking means.

4. In an electric meter, a driving shaft, a motor rotating said shaft, a second shaft, a magnetic drag connection between the two shafts causing the second shaft to turn in a given direction, means dependent upon the position of the second shaft braking said first shaft, and a dynamometer adapted to turn the second shaft in a direction contrary to that given it by the first shaft.

5. In an electric meter, a driving shaft, a motor rotating said shaft, a disk rigidly mounted on the shaft, a second shaft, a magnet rigidly mounted thereon in operative relation with the disk, means in operative relation with the magnet for braking the first shaft, and a dynamometer adapted to restrain the action of said braking means.

6. In an electric meter, a driving shaft, a motor rotating said shaft, a disk rigidly mounted on the shaft, a second shaft, a magnet rigidly mounted thereon in operative relation with the disk, a braking mechanism in operative relation with the first shaft, means for imparting initial action to said mechanism, means in operative relation with the magnet operating said mechanism, and a dynamometer restraining the action of said magnet operating mechanism.

7. In an electric meter, a driving shaft, a motor normally having a tendency to rotate at a certain speed connected to said shaft, a disk rigidly mounted on said shaft, a second shaft, a magnet rigidly mounted thereon having its poles in operative relation with the disk, a brake adapted to brake the first shaft, a lever connected to the brake in operative relation with the magnet adapted to apply the brake when the magnet is turned in the same direction as the disk, means for imparting an initial pressure to the brake when the magnet is not moved, and a dynamometer in operative relation with the second shaft adapted to turn the magnet in a direction contrary to that given it by the disk.

8. In an electric meter, a registering mechanism, a driving shaft operating the same, an electric motor having a tendency to rotate at a certain speed connected to said shaft, a disk rigidly mounted on said shaft, a second disk geared to the first, a second shaft substantially in line with the first, a U-shaped magnet rigidly mounted on the second shaft having its poles in operative relation with the first disk, a brake adapted to act upon the second disk, a lever connected to the brake in operative relation with the magnet adapted to apply said brake when the magnet is turned in the same direction as the disk, a spring for imparting an initial pressure to the brake when the magnet is not moved, a dynamometer having fixed and movable coils, the movable coil being rigidly mounted on the second shaft connected to turn the magnet in a direction contrary to that given it by the first disk when current flows in the dynamometer coils.

In witness whereof, I have hereunto set my hand this 15th day of March, 1910.

JUSTUS B. ENTZ.

Witnesses:
W. W. CHASE,
E. G. GRIESE.